Oct. 19, 1965       S. D. SILLIMAN ETAL       3,213,362
PHASE DETECTOR USING ZENER DIODE BRIDGES AND A SUMMING NETWORK
Filed Jan. 24, 1962
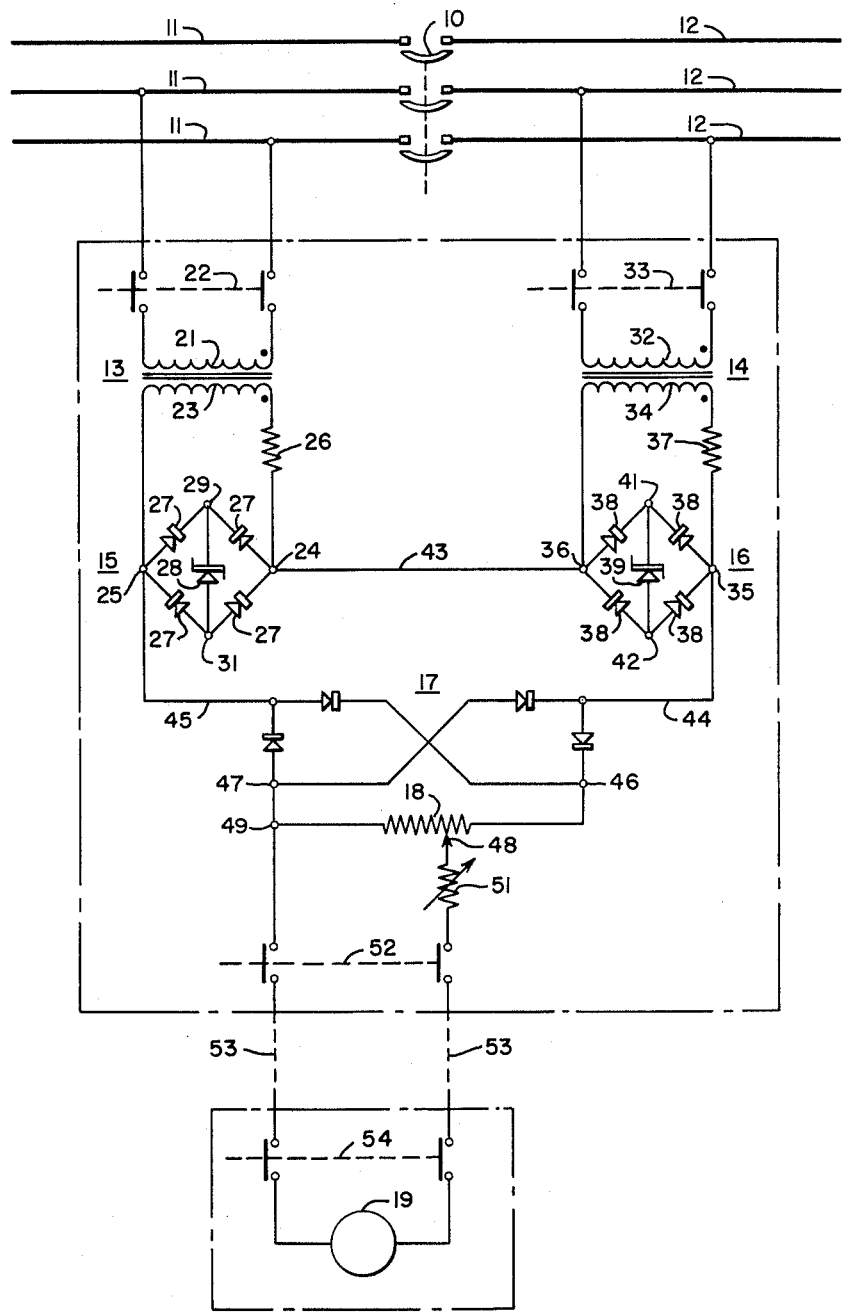
WITNESSES:
Bernard R. Gieguay
James F. Young
INVENTORS
Sheldon D. Silliman and
William F. Cruess.
BY
Clement L. McHale
ATTORNEY United States Patent Office 3,213,362
Patented Oct. 19, 1965

3,213,362
PHASE DETECTOR USING ZENER DIODE
BRIDGES AND A SUMMING NETWORK
Sheldon D. Silliman, Forest Hills, and William F. Cruess, Monroeville, Pa., assignors to Westinghouse Electric Corporation, East Pittsburgh, Pa., a corporation of Pennsylvania
Filed Jan. 24, 1962, Ser. No. 168,426
3 Claims. (Cl. 324—87)

This invention relates, generally, to supervisory control and telemetering systems and, more particularly, to means for telemetering the phase displacement between two alternating voltages.

In certain breaker closing operations, the phase relationship between voltages on the two sides of the open breaker must be checked. Heretofore, relays for detecting static phase displacement have been available. However, these relays have been operable over only a limited range of degrees of phase displacement such as, for example, 20–60 degrees.

Also devices for telemetering phase displacement where a frequency difference exists (synchronizing indication) have been available but these have been inaccurate because they are affected by voltage magnitude and also because the output is a sine function which provides a scale which is crowded at the most important points.

An object of this invention is to provide means for detecting and indicating voltage phase displacement over a range of from 0 to 180 degrees.

A basic problem when utilizing the conventional "brightdark" lamp circuit having two transformers with through secondaries connected in series circuit relation is that voltage magnitude is a significant factor when phase displacement is of primary interest.

Another object of this invention is to provide phase displacement detecting means which is not adversely affected by voltage magnitude variations.

A further object of the invention is to provide a remote metered indication of the phase displacement between two voltages.

A still further object of the invention is to provide for limiting the secondary voltage of a transformer to a predetermined maximum.

Another object is to provide a system having a linear, rather than a sine function output.

Other objects of the invention will be explained fully hereinafter or will be apparent to those skilled in the art.

In accordance with one embodiment of the invention, a bridge-Zener diode circuit is connected across the secondary winding of each one of two transformers. The primary winding of one transformer is connected across one phase of a voltage source connected to one side of an open circuit breaker. The primary winding of the other transformer is connected to the corresponding phase of another voltage source connected to the other side of the open breaker. The secondary voltages of the two transformers are limited to a predetermined maximum by the bridge-Zener diode circuits. The resulting two secondary voltages are added to give an output having a range of 0 to twice the maximum voltage of each secondary depending upon the phase displacement between the two voltage sources. The output voltage is rectified and applied to a line wire circuit to operate a remote meter, thereby providing an indication of the phase displacement between the two voltage sources.

For a better understanding of the nature and objects of the invention, reference may be made to the following detailed description, taken in conjunction with the accompanying drawing, in wihch the single figure is a diagrammatic view of a system embodying the principal features of the invention.

Referring now to the drawing, the system shown therein comprises a three-phase circuit breaker 10 for connecting three-phase power conductors 11 and 12 which are energized from two different sources of voltage (not shown). Before closing the circuit breaker 10 it is desirable to obtain an indication of the phase displacement between the voltage sources to which the conductors 11 and 12 are connected, when the two different sources of voltages are already connected to the power system at some other point. Furthermore, it is desirable to minimize the effect of voltage variations of the voltage sources.

This may be accomplished by providing two transformers 13 and 14, two bridge-Zener diode circuits 15 and 16, a full-wave rectifier 17, a potentiometer 18 at one station and an ammeter 19 located at another station remote from the first station. The transformer 13 has a primary winding 21 which may be connected across one phase of the three-phase conductor 11 by closing a switch 22. A secondary winding 23 of the transformer 13 is connected across input terminals 24 and 25 of the bridge circuit 15 in series with a resistor 26. The bridge circuit 15 comprises four rectifiers 27 and a Zener diode 28 which is connected across output terminals 29 and 31 of the bridge.

Likewise, a primary winding 32 of the transformer 14 may be connected across a corresponding phase of the three-phase conductor 12 by closing a switch 33. A secondary winding 34 of the transformer 14 is connected across input terminals 35 and 36 of the bridge circuit 16 in series with a resistor 37. The bridge circuit 16 comprises four rectifiers 38 and a Zener diode 39 which is connected across output terminals 41 and 42 of the bridge. The transformers 13 and 14 have the same voltage ratings.

The Zener diodes 28 and 39 are so constructed that each has a breakover voltage of, for example, 18 volts. Thus, the diode 28 will pass current from the terminal 29 to the terminal 31 of the bridge 15 when 18 volts are impressed across the terminals. The rectifiers 27 are so arranged that not current can flow from the terminal 31 to the terminal 29 through the diode 28. Therefore, the bridge-Zener diode circuit 15 limits the secondary voltage of the transformer 13 to a maximum of 18 volts. Likewise, the bridge-Zener diode circuit 16 limits the secondary voltage of the transformer 14 to a maximum of 18 volts.

The transformer secondaries 23 and 24 are so connected through conductors 43 and 44, the full-wave rectifier 17 and conductor 45 that their voltages are added, thereby, providing a cumulative output voltage which has a range of 0 to 36 volts depending upon the phase displacement between the voltage sources connnected to the conductors 11 and 12. When there is zero phase displacement, the output voltage is 36 and when there is 180° phase displacement the output voltage is 0.

The output voltage is rectified by the rectifier 17 and applied to the potentiometer 18 which is connected across output terminals 46 and 47 of the rectifier. The potentiometer 18 may be adjusted to provide a desired voltage, for example 30, across its terminals 48 and 49 when there is no phase displacement between the voltage sources, i.e. when a generator is being connected to a power system.

The terminals 48 and 49 of the potentiometer 18 may be connected to the ammeter 19 through a variable resistor 51, a switch 52, line conductors 53 and a switch 54. The resistor 51 may be so adjusted that the total loop resistance including that of the line wires will be a predetermined amount, for example 10,000 ohms. Thus, the ammeter 19 may be calibrated to read, for example, from 0 to 3 milliamperes, thereby indicating the phase displacement over a range of 0 to 180 degrees.

From the foregoing description, it is evident that the invention provides a means for detecting and indicating phase angle displacement which is not adversely affected by voltage variations and, therefore, gives an accurate indication. The device may be utilized as a synchronizing indicator as well as a phase angle indicator, thereby broadening its field of application. It may be readily utilized in conjunction with supervisory control apparatus.

Since numerous changes may be made in the above-described construction and different embodiments of the invention may be made without departing from the spirit and scope thereof, it is intended that all the matter contained in the foregoing description or shown in the accompanying drawings shall be interpreted as illustrative and not in a limiting sense.

We claim as our invention:

1. Means for detecting the phase displacement between two alternating voltage sources comprising, a first transformer having a primary winding connected across one phase of one voltage source and a secondary winding; a second transformer having a primary winding connected across the corresponding phase of the other voltage source and a secondary winding; the secondary windings of said transformers having the same voltage rating, a four rectifier bridge circuit having input terminals connected across each secondary winding and output terminals; a Zener diode having a predetermined breakover voltage connected across the output terminals of each bridge circuit to limit each alternating secondary voltage to a predetermined maximum, a pair of output terminals, and conductor means for connecting said secondary windings in series between said pair of output terminals whereby the voltages across said secondary windings are added to provide an output voltage across the pair of terminals proportional to only the phase displacement between the two voltage sources, full wave rectifier means connected to said pair of terminals for rectifying said output voltage, and meter means connected in circuit relation with said rectifier means to be responsive to the rectified output voltage for indicating the phase displacement between said voltage sources.

2. Means for detecting the phase displacement between two alternating voltage sources comprising, a first transformer having a primary winding connected across one phase of one voltage source and a secondary winding, a second transformer having a primary winding connected across the corresponding phase of the other voltage source and a secondary winding; the secondary windings of said transformers having the same voltage rating, a four rectifier bridge circuit having input terminals connected across each secondary winding and output terminals; a Zener diode having a predetermined breakover voltage connected in each of said bridge circuits across said output terminals to limit the alternating secondary voltage of either polarity to said breakover voltage, a pair of output terminals, and conductor means for connecting the secondary windings in series between the pair of terminals whereby an output voltage is provided across the pair of terminals having a range of 0 to twice the breakover voltage of the Zener diode depending upon only the phase displacement between the two voltage sources.

3. In phase displacement detecting means for detecting the phase displacement between two alternating voltage sources, in combination, first and second transformers each having a primary winding and a secondary winding, each primary winding being connected across a different voltage source, first and second four rectifier bridge circuits each having two input terminals and two output terminals, the two input terminals of each bridge circuit being connected across the secondary winding of a different transformer, first and second Zener diodes each having a predetermined breakover voltage, and each of said Zener diodes being connected across the other two terminals of a different bridge circuit to limit the alternating secondary voltage of one of the transformers to said breakover voltage, a pair of output terminals, said secondary windings being connected in series between the pair of terminals whereby the alternating voltages across said secondary windings are added to obtain an output across the pair of output terminals which varies with only said phase displacement.

References Cited by the Examiner

UNITED STATES PATENTS

| | | | |
|---|---|---|---|
| 2,225,653 | 12/40 | Monk | 324—89 X |
| 2,349,663 | 5/44 | Langer | 324—83 X |
| 2,601,354 | 6/52 | Wylie | 324—89 X |
| 2,769,131 | 10/56 | Immel | 317—52 X |
| 2,829,343 | 4/58 | Miller | 324—87 X |
| 2,931,948 | 4/60 | Thompson. | |
| 2,958,038 | 10/60 | Kwast | 324—78 X |
| 3,068,407 | 12/62 | Altman | 324—87 X |
| 3,131,329 | 4/64 | Braun | 317—52 |

FOREIGN PATENTS 952,832  11/56  Germany.

WALTER L. CARLSON, *Primary Examiner.*